(12) United States Patent
Sutherland et al.

(10) Patent No.: US 11,262,854 B2
(45) Date of Patent: Mar. 1, 2022

(54) SENSING MOVEMENT OF A HAND-HELD CONTROLLER

(71) Applicant: Hewlett-Packard Development Company, L.P., Spring, TX (US)

(72) Inventors: Michael Sutherland, Palo Alto, CA (US); Rafael Ballagas, Palo Alto, CA (US); Hiroshi Horii, Palo Alto, CA (US); Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/629,831

(22) PCT Filed: Sep. 25, 2017

(86) PCT No.: PCT/US2017/053237
§ 371 (c)(1),
(2) Date: Jan. 9, 2020

(87) PCT Pub. No.: WO2019/059944
PCT Pub. Date: Mar. 28, 2019

(65) Prior Publication Data
US 2021/0149500 A1    May 20, 2021

(51) Int. Cl.
*G06F 3/0346* (2013.01)
*G06F 3/0354* (2013.01)
*G06F 3/038* (2013.01)

(52) U.S. Cl.
CPC .......... *G06F 3/0346* (2013.01); *G06F 3/0383* (2013.01); *G06F 3/03543* (2013.01); *G06F 2203/0384* (2013.01)

(58) Field of Classification Search
CPC .. G06F 3/0346; G06F 3/03543; G06F 3/0354; G06F 3/0383; G06F 2203/0384; A63F 2300/105; A63F 13/211
USPC .................................. 345/158, 163; 463/37
See application file for complete search history.

(56) References Cited

U.S. PATENT DOCUMENTS

| | | | |
|---|---|---|---|
| 5,565,891 A | 10/1996 | Armstrong | |
| 5,936,612 A | 8/1999 | Wang | |
| 6,069,594 A * | 5/2000 | Barnes | G01S 5/186 |
| | | | 345/156 |
| 9,946,356 B2 * | 4/2018 | Liberty | G06F 3/033 |
| 2006/0092133 A1* | 5/2006 | Touma | G06F 3/04815 |
| | | | 345/158 |

(Continued)

OTHER PUBLICATIONS

Kovarova, A et al., Can Virtual Reality Be Better Controlled by a Smart Phone Than by a Mouse and a Keyboard?, Jun. 2014, http://dl.acm.org/citation.cfm?id=2659608&CFID=787341690&CFTOKEN=18636436.

*Primary Examiner* — Koosha Sharifi-Tafreshi
(74) *Attorney, Agent, or Firm* — Dicke Billig & Czaja PLLC

(57) ABSTRACT

An input device for providing input to a computing device includes a hand-held controller movable across and above a work surface. The input device includes a mouse sensor positioned on or in the hand-held controller to sense two-dimensional (2D) translation data representing translational movement of the hand-held controller across the work surface, and a six degree of freedom (6DOF) sensor positioned on or in the hand-held controller to sense 6DOF data representing position and orientation of the hand-held controller above the work surface.

19 Claims, 8 Drawing Sheets

(56) References Cited

U.S. PATENT DOCUMENTS

| | | |
|---|---|---|
| 2007/0146325 A1 | 6/2007 | Poston et al. |
| 2011/0199305 A1 | 8/2011 | Suh |
| 2012/0319949 A1 | 12/2012 | Lee |
| 2013/0027299 A1* | 1/2013 | Tsukahara .............. G06F 3/0354 345/157 |
| 2015/0057803 A1 | 2/2015 | Bosscher et al. |
| 2015/0175390 A1 | 6/2015 | Ogawa et al. |
| 2016/0357249 A1* | 12/2016 | Webb ...................... G06F 3/017 |
| 2017/0083082 A1 | 3/2017 | Wang et al. |
| 2017/0095732 A1 | 4/2017 | Ghaffari et al. |
| 2017/0199577 A1* | 7/2017 | Koomen ................... G01L 1/20 |
| 2018/0210565 A1* | 7/2018 | Chang ................. G06F 3/03544 |

* cited by examiner

SENSING MOVEMENT OF A HAND-HELD CONTROLLER

BACKGROUND

Augmented reality (AR) systems and virtual reality (VR) systems may include a head-mounted display (HMD) that is tracked in the 3D workspace. These systems may also include controllers for each of the user's hands, which are also tracked. The systems allow the user to interact with the virtual world.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Virtual reality (VR) work may take place at the desktop, particularly for commercial/workstation applications, including mixed reality at the desktop. Using a separate mouse and VR controller may limit what a user can accomplish, such as not being able to perform the selection of an object using a mouse click and then drag-position the object in virtual space all as one action.

Some examples disclosed herein are directed to system implementations that allow the functionality of a VR controller and a computer mouse to be combined. Some examples disclosed herein are directed to an input device that operates as a mouse on a work surface (e.g., a desktop), but can be lifted off the desktop and used to interact with objects (typically virtual) in the space above the work surface, which allows the functionality of a VR controller and a computer mouse to be combined. When the input device is on the work surface, the controller interprets interactions as mouse interactions, and routes data to the operating system as mouse events (e.g., mouse delta-x, delta-y events). When the input device is lifted above the work surface, the controller interprets interactions as VR controller interactions, and routes data to the operating system as VR controller 6DOF events. In some examples, the input device may sense when it is on a surface using a desktop detect sensor (e.g., a micro-switch).

Figure 1:
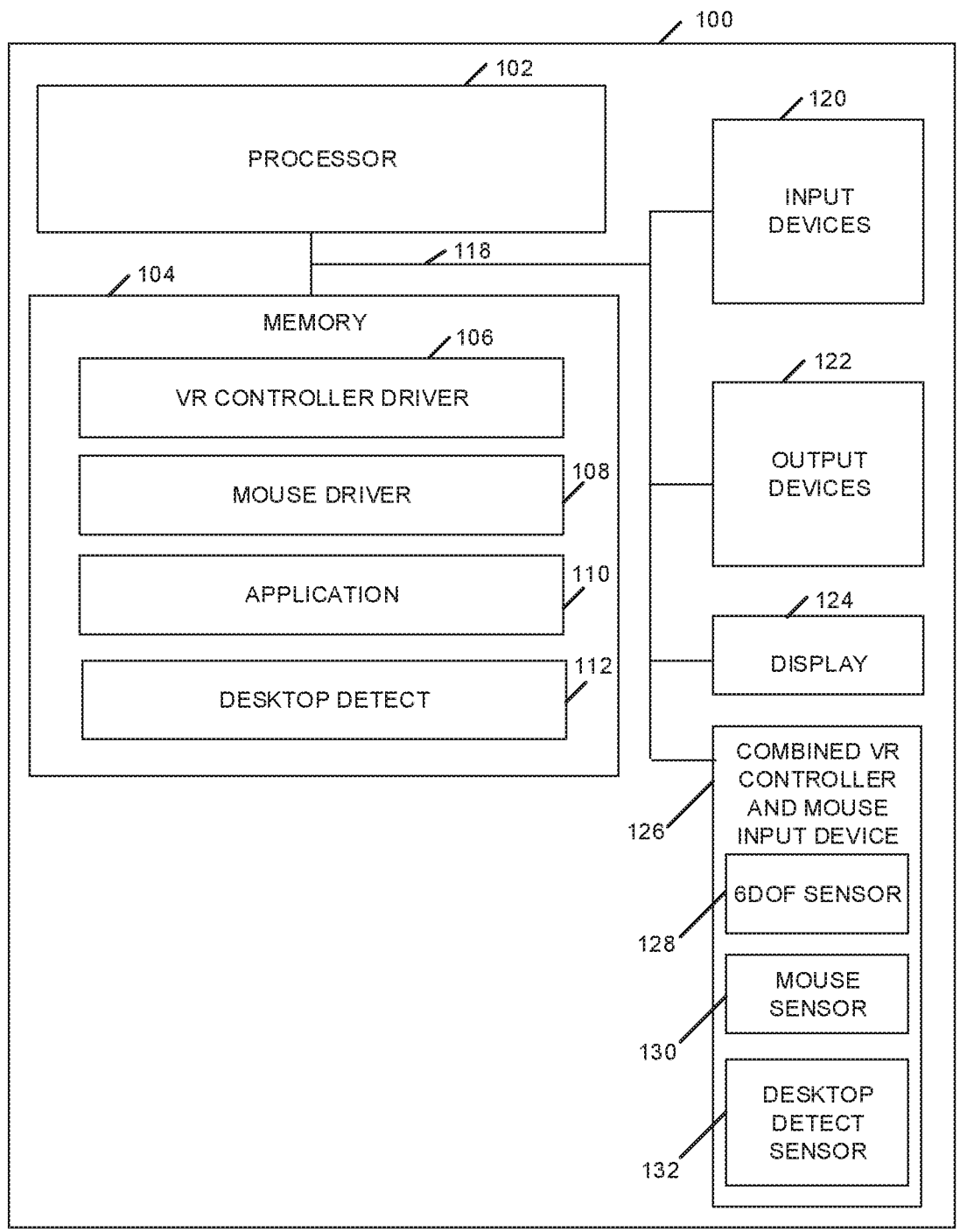
FIG. 1 is a block diagram illustrating a computing system with a combined VR controller and mouse input device according to one example.

FIG. 1 is a block diagram illustrating a computing system 100 with a combined VR controller and mouse input device according to one example. Computing system 100 includes at least one processor 102, a memory 104, input devices 120, output devices 122, display 124, and combined VR controller and mouse input device 126. In the illustrated example, processor 102, memory 104, input devices 120, output devices 122, display 124, and combined VR controller and mouse input device 126 are communicatively coupled to each other through communication link 118.

Input devices 120 include a keyboard, mouse, data ports, and/or other suitable devices for inputting information into system 100. Output devices 122 include speakers, data ports, and/or other suitable devices for outputting information from system 100.

Processor 102 includes a central processing unit (CPU) or another suitable processor. In one example, memory 104 stores machine readable instructions executed by processor 102 for operating the system 100. Memory 104 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 104 is non-transitory in the sense that it does not encompass a transitory signal but instead is made up of at least one memory component to store machine executable instructions for performing techniques described herein.

Memory 104 stores VR controller driver module 106, mouse driver module 108, application module 110, and desktop detect module 112. Processor 102 executes instructions of modules 106, 108, 110, and 112 to perform the techniques described herein. It is noted that some or all of the functionality of modules 106, 108, 110, and 112 may be implemented using cloud computing resources.

In one example, the display 124 includes a VR or AR display device, or other 3D output device, as well as position and orientation sensors. The computing system 100 may generate a 3D visualization. In an example, the display 124 may include a head-mounted display (HMD) device, such as a VR headset implementing stereoscopic images called stereograms to represent the 3D visualization. The 3D visualization may include still images or video images. The VR headset may present the 3D visualization to a user via a number of ocular screens. In an example, the ocular screens are placed in an eyeglass or goggle system allowing a user to view both ocular screens simultaneously. This creates the illusion of a 3D visualization using two individual ocular screens. The position and orientation sensors may be used to detect the position and orientation of the VR headset in 3D space as the VR headset is positioned on the user's head, and the sensors may provide this data to processor 102 such that movement of the VR headset as it sits on the user's head is translated into a change in the point of view within the 3D visualization.

Although one example uses a VR headset to present the 3D visualization, other types of environments may also be used. In an example, an AR environment may be used where aspects of the real world are viewable in a visual representation while a 3D object is being drawn within the AR environment. Thus, much like the VR system described herein, an AR system may include a visual presentation provided to a user via a computer screen or a headset including a number of screens, among other types of devices to present the 3D visualization. Thus, the present description contemplates the use of not only a VR environment but an AR environment as well.

Combined VR controller and mouse input device 126 includes a six degree of freedom (6DOF) sensor 128, a mouse sensor 130, and a desktop detect sensor 132. The 6DOF sensor 128 may detect the position and orientation of the input device 126 in space using a ring of tracking LEDs that can be tracked by external tracking devices such as external cameras, or from internal cameras on the VR headset. Alternatively, a ring of photo sensors on the device may be used to track a light pattern produced by external beacons. The mouse sensor 130 determines X/Y motion of the input device 126 on a work surface using optical sensing or mechanical trackball based sensing on the bottom surface of the input device 126. The desktop detect sensor 132, which is a micro-switch in one example, detects when the input device 126 is in contact with the work surface. In other examples, rather than using a desktop detect sensor 132, the system 100 may detect when the input device 126 is in contact with the work surface by recognizing when the z-height, roll and pitch of the input device 126 as reported by the 6DOF sensor 128 correspond to desktop use parameters. These parameters may be set during a calibration phase.

The 6DOF sensor 128 sends 6DOF signals, which represent the current position and orientation of the input device 126, to VR controller driver 106. Based on the received 6DOF signals, the VR controller driver 106 generates 6DOF events, and outputs the 6DOF events to application module 110. Based on the received 6DOF events, the application module 110 may cause a change in the information being displayed to the user on display 124.

The mouse sensor 130 sends mouse signals, which represent the X/Y motion of the input device 126 on a work surface, to mouse driver 108. Based on the received mouse signals, the mouse driver 108 generates mouse events, and outputs the mouse events to application module 110. Based on the received mouse events, the application module 110 may cause a change in the information being displayed to the user on display 124.

The desktop detect sensor 132 generates desktop detect signals, which indicate whether the input device 126 is currently positioned on a work surface (e.g., a desktop). The desktop detect signals may be used by the system 100 to control the flow of 6DOF events and mouse events to the application module 110.

In some examples, the drivers 106 and 108 may continually output 6DOF events and mouse events to the application module 110 at the same time regardless of whether the input device 126 is on the work surface or not. In some examples, the mouse driver 108 may provide mouse events only when the input device 126 is on the work surface (e.g., to prevent unwanted mouse events due to fingers moving past the mouse sensor 130 when the input device 126 is being used in the air above the work surface). In some examples, the VR controller driver 106 may provide 6DOF events only when the input device 126 is away from the work surface and not on the work surface. If 6DOF events are provided to the application module 110 while the input device 126 is on the work surface, the precision of the horizontal components of the 6DOF events reported to the application module 110 may be increased by using the mouse events, since the mouse sensor 130 may report changes in X and Y with ten to a hundred times the precision of 6DOF sensor 128.

Some examples of system 100 may not use a mouse sensor 130. In one form of these examples, an attachment may be added to the input device 126 to stabilize the input device 126 for easier use on the desktop, and to hold the desktop detect sensor 132. In these examples, when the system 100 detects that the input device 126 is on the desktop, the VR controller driver 106 synthesizes mouse events from the 6DOF events. These examples may involve tracking the input device 126 at all times. Note that in the case of systems where a HMD does the controller tracking, this would involve the HMD being positioned with a view of the desktop, even when not in use.

In one example, the various subcomponents or elements of the system 100 may be embodied in a plurality of different systems, where different modules may be grouped or distributed across the plurality of different systems. To achieve its desired functionality, system 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Figure 2:
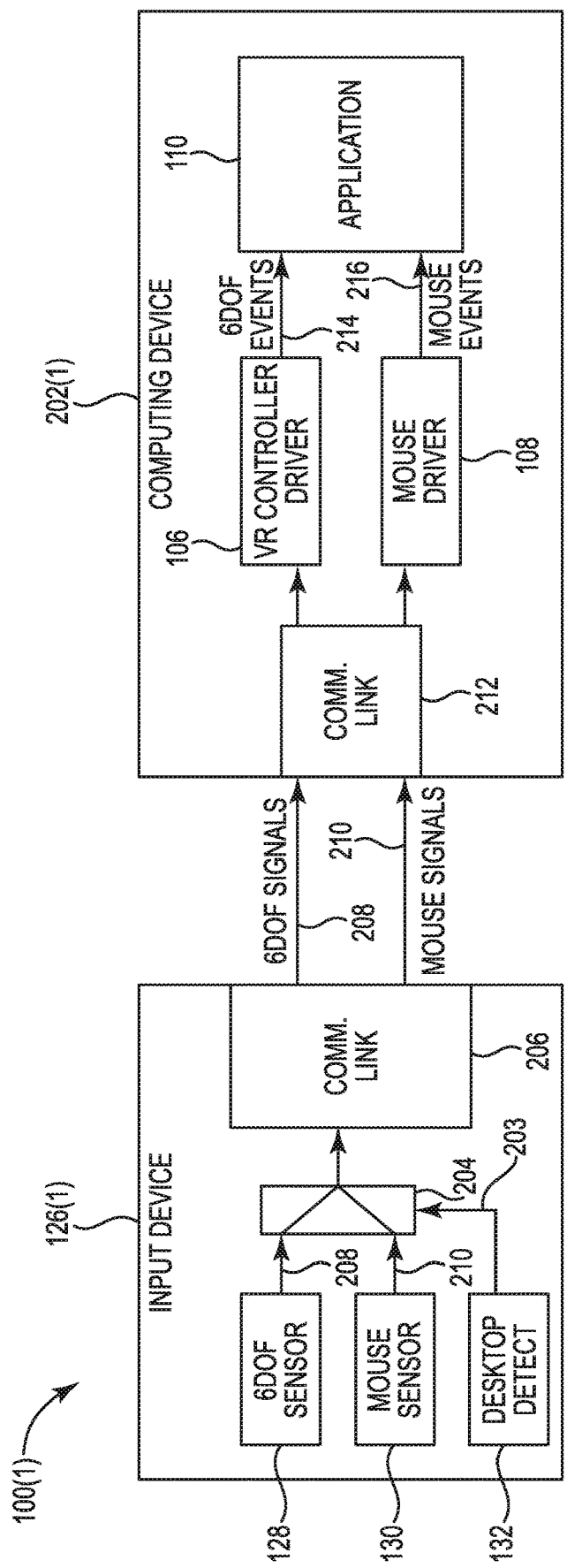
FIG. 2 is a block diagram illustrating the computing system shown in FIG. 1 generating and processing six degree of freedom (6DOF) signals and mouse signals according to one example.

FIG. 2 is a block diagram illustrating the computing system shown in FIG. 1 generating and processing 6DOF signals and mouse signals according to one example. In the illustrated example, the computing system 100(1) includes input device 126(1) and computing device 202(1). Computing system 100(1) is an example implementation of the computing system 100 shown in FIG. 1. Input device 126(1) is an example implementation of the input device 126 shown in FIG. 1, and computing device 202(1) is an example implementation of other elements of the computing system 100 shown in FIG. 1. Computing device 202(1) may be a personal computer or other type of computing device.

Input device 126(1) includes 6DOF sensor 128, mouse sensor 130, desktop detect sensor 132, multiplexer 204, and communication (comm) link 206. 6DOF sensor 128 outputs 6DOF signals 208 to multiplexer 204. Mouse sensor 130 outputs mouse signals 210 to multiplexer 204. Desktop detect sensor 132 outputs desktop detect signals 203 to multiplexer 204. Multiplexer 204 selectively outputs either the received 6DOF signals 208 or the mouse signals 210 to the communication link 206 based on the value of the received desktop detect signals 203. In this manner, the input device 126(1) can sense when it is being used on the desktop, or above the desktop, and enables sending only the corresponding signals (i.e., mouse signals 210 when used on the desktop, and 6DOF signals 208 when used above the desktop) through to the communication link 206. Communication link 206 outputs received 6DOF signals 208 and/or mouse signals 210 to communication link 212 of the computing device 202(1). The communication links 206 and 212 may be either wired or wireless communication links.

Computing device 202(1) includes communication link 212, VR controller driver 106, mouse driver 108, and application module 110. Communication link 212 outputs the received 6DOF signals 208 to VR controller driver 106, and outputs the received mouse signals 210 to mouse driver 108. Based on the received 6DOF signals 208, VR controller driver 106 generates corresponding 6DOF events 214, and outputs the 6DOF events 214 to application module 110 for processing. Based on the received mouse signals 210, mouse driver 108 generates corresponding mouse events 216, and outputs the mouse events 216 to application module 110 for processing.

Figure 3:
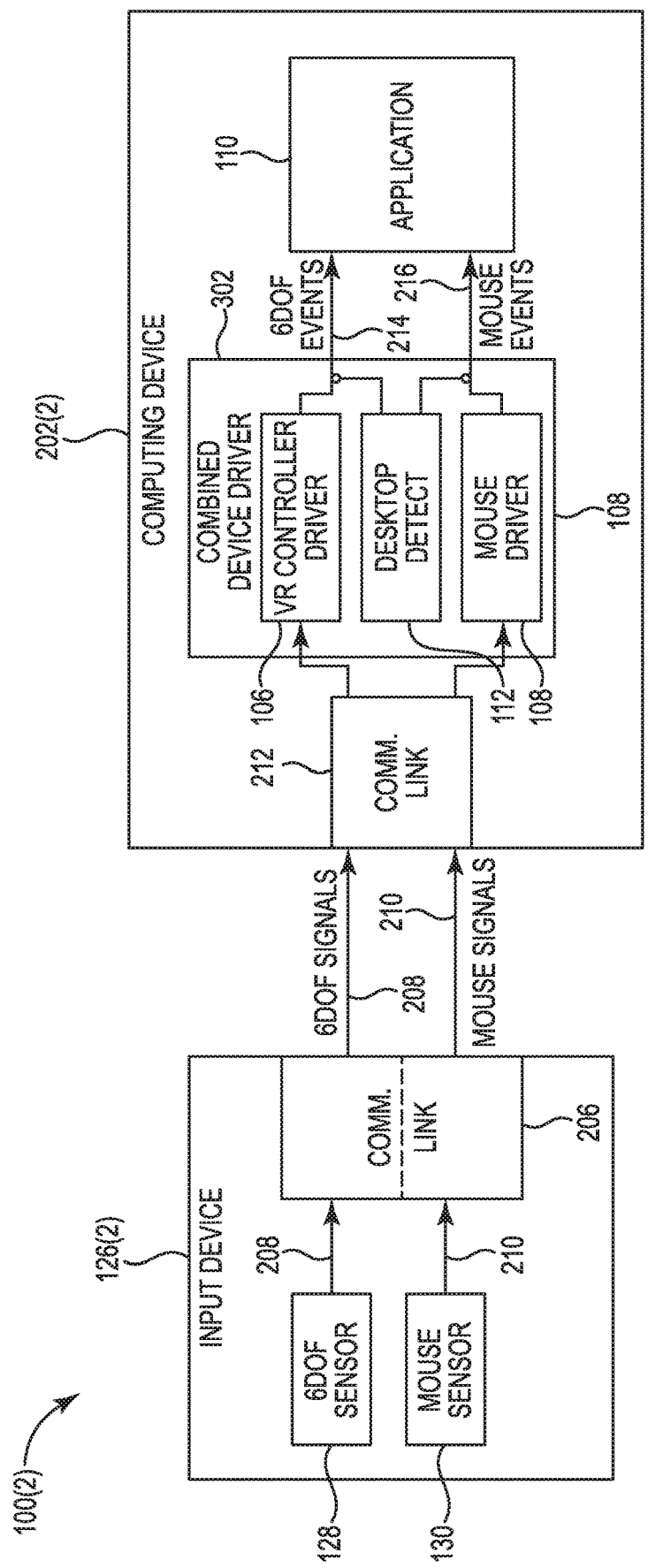
FIG. 3 is a block diagram illustrating the computing system shown in FIG. 1 generating and processing 6DOF signals and mouse signals according to another example.

FIG. 3 is a block diagram illustrating the computing system shown in FIG. 1 generating and processing 6DOF signals and mouse signals according to another example. In the illustrated example, the computing system 100(2) includes input device 126(2) and computing device 202(2). Computing system 100(2) is an example implementation of the computing system 100 shown in FIG. 1. Input device 126(2) is an example implementation of the input device 126 shown in FIG. 1, and computing device 202(2) is an example implementation of other elements of the computing system 100 shown in FIG. 1. Computing device 202(2) may be a personal computer or other type of computing device.

Input device 126(2) includes 6DOF sensor 128, mouse sensor 130, and communication (comm) link 206. 6DOF sensor 128 outputs 6DOF signals 208 to communication link 206. Mouse sensor 130 outputs mouse signals 210 to communication link 206. Communication link 206 outputs received 6DOF signals 208 and mouse signals 210 to communication link 212 of the computing device 202(2). In examples in which the mouse sensor 130 is a separate physical attachment to the input device 126(2), the mouse sensor 130 may have its own communication link separate from communication link 206.

Computing device 202(2) includes communication link 212, combined device driver 302, and application module 110. The combined device driver 302 includes VR controller driver 106, desktop detect module 112, and mouse driver 108. Communication link 212 outputs the received 6DOF signals 208 to VR controller driver 106, and outputs the received mouse signals 210 to mouse driver 108. Based on the received 6DOF signals 208, VR controller driver 106 generates corresponding 6DOF events 214, and, if enabled, outputs the 6DOF events 214 to application module 110 for processing. Based on the received mouse signals 210, mouse driver 108 generates corresponding mouse events 216, and, if enabled, outputs the mouse events 216 to application module 110 for processing. The desktop detect module 112 communicates with the VR controller driver 106 and the mouse driver 108 to determine when the input device 126(2) is being used on the desktop, or above the desktop, and enables sending only the corresponding events (i.e., mouse events 216 when used on the desktop, and 6DOF events 214 when used above the desktop) through to the application module 110. The desktop detect module 112 may include a calibration mechanism to determine the height of the desktop as sensed by the 6DOF sensor 128.

Figure 4:
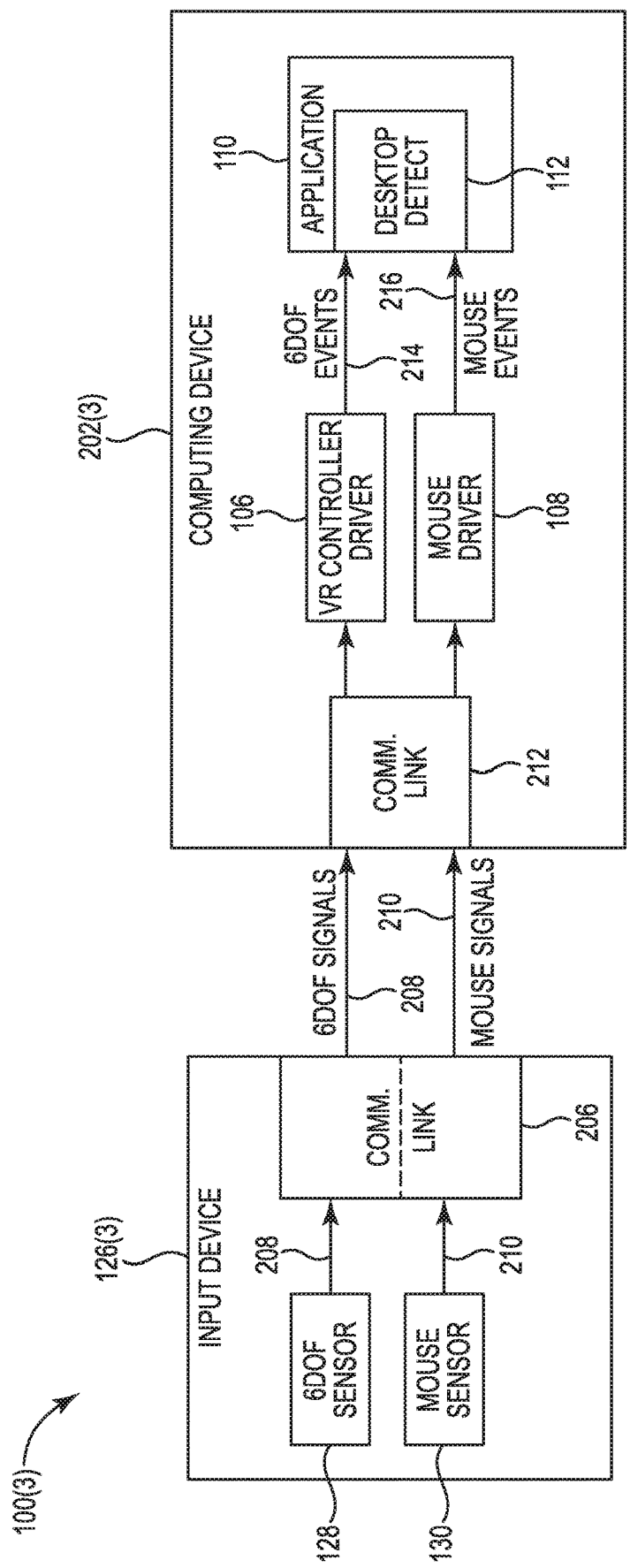
FIG. 4 is a block diagram illustrating the computing system shown in FIG. 1 generating and processing 6DOF signals and mouse signals according to another example.

FIG. 4 is a block diagram illustrating the computing system shown in FIG. 1 generating and processing 6DOF signals and mouse signals according to another example. In the illustrated example, the computing system 100(3) includes input device 126(3) and computing device 202(3). Computing system 100(3) is an example implementation of the computing system 100 shown in FIG. 1. Input device 126(3) is an example implementation of the input device 126 shown in FIG. 1, and computing device 202(3) is an example implementation of other elements of the computing system 100 shown in FIG. 1. Computing device 202(3) may be a personal computer or other type of computing device.

Input device 126(3) includes 6DOF sensor 128, mouse sensor 130, and communication (comm) link 206. 6DOF sensor 128 outputs 6DOF signals 208 to communication link 206. Mouse sensor 130 outputs mouse signals 210 to communication link 206. Communication link 206 outputs received 6DOF signals 208 and mouse signals 210 to communication link 212 of the computing device 202(3). In examples in which the mouse sensor 130 is a separate physical attachment to the input device 126(3), the mouse sensor 130 may have its own communication link separate from communication link 206.

Computing device 202(3) includes communication link 212, VR controller driver 106, mouse driver 108, and application module 110. Communication link 212 outputs the received 6DOF signals 208 to VR controller driver 106, and outputs the received mouse signals 210 to mouse driver 108. Based on the received 6DOF signals 208, VR controller driver 106 generates corresponding 6DOF events 214, and outputs the 6DOF events 214 to application module 110 for processing. Based on the received mouse signals 210, mouse driver 108 generates corresponding mouse events 216, and outputs the mouse events 216 to application module 110 for processing. In the illustrated example, the application module 110 includes the desktop detect module 112. Based on the received 6DOF events 214 and the received mouse events 216, the desktop detect module 112 determines when the input device 126(3) is being used on the desktop, or above the desktop, and enables the application module 110 to only use the corresponding events (i.e., mouse events 216 when used on the desktop, and 6DOF events 214 when used above the desktop). The desktop detect module 112 may include a calibration mechanism to determine the height of the desktop as sensed by the 6DOF sensor 128.

Figure 5:
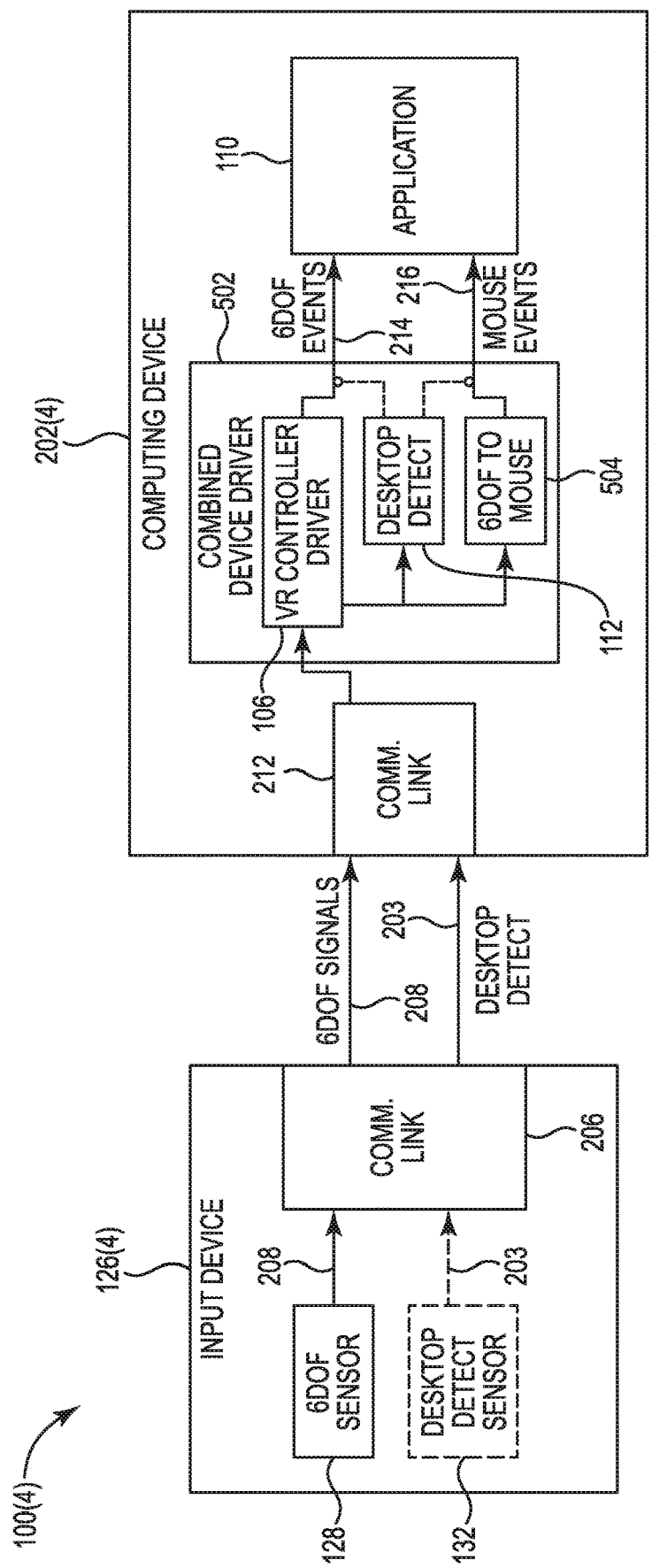
FIG. 5 is a block diagram illustrating the computing system shown in FIG. 1 generating and processing 6DOF signals and mouse signals according to another example.

FIG. 5 is a block diagram illustrating the computing system shown in FIG. 1 generating and processing 6DOF signals and mouse signals according to another example. In the illustrated example, the computing system 100(4) includes input device 126(4) and computing device 202(4). Computing system 100(4) is an example implementation of the computing system 100 shown in FIG. 1. Input device 126(4) is an example implementation of the input device 126 shown in FIG. 1, and computing device 202(4) is an example implementation of other elements of the computing system 100 shown in FIG. 1. Computing device 202(4) may be a personal computer or other type of computing device.

Input device 126(4) includes 6DOF sensor 128, desktop detect sensor 132, and communication (comm) link 206. 6DOF sensor 128 outputs 6DOF signals 208 to communication link 206. Other examples of input device 126(4) may not include desktop detect sensor 132. If present, the desktop detect sensor 132 outputs desktop detect signals 203 to communication link 206. Communication link 206 outputs received 6DOF signals 208 and desktop detect signals 203 to communication link 212 of the computing device 202(4).

Computing device 202(4) includes communication link 212, combined device driver 502, and application module 110. The combined device driver 502 includes VR controller driver 106, desktop detect module 112, and 6DOF to mouse converter module 504. Communication link 212 outputs the received 6DOF signals 208 and desktop detect signals 203 to VR controller driver 106. Based on the received 6DOF signals 208, VR controller driver 106 generates corresponding 6DOF events 214, and, if enabled, outputs the 6DOF events 214 to application module 110 for processing. Based on the received 6DOF signals 208, VR controller driver 106 also communicates with the 6DOF to mouse converter module 504 to cause the module 504 to convert the translational movement information in the 6DOF signals 208 into mouse events 216, and, if enabled, the module 504 outputs the mouse events 216 to application module 110 for processing. The desktop detect module 112 communicates with the VR controller driver 106 to determine when the input device 126(4) is being used on the desktop, or above the desktop, and enables sending only the corresponding events (i.e., mouse events 216 when used on the desktop, and 6DOF events 214 when used above the desktop) through to the application module 110.

In one example, the desktop detect module 112 makes its determination based on the received 6DOF signals 208 and the received desktop detect signals 203. In another example, the input device 126(4) does not include a desktop detect sensor 132, and the desktop detect module 112 makes its determination based solely on the received 6DOF signals 208. The desktop detect module 112 may also enable sending both sets of events 214 and 216 at the same time to the application module 110.

Figure 6B:
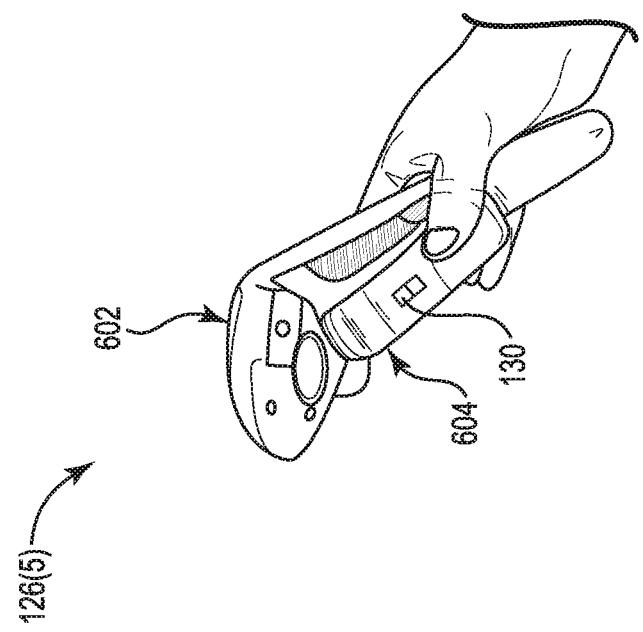
FIGS. 6A and 6B are diagrams illustrating a combined VR controller and mouse input device according to one example.
Figure 6A:
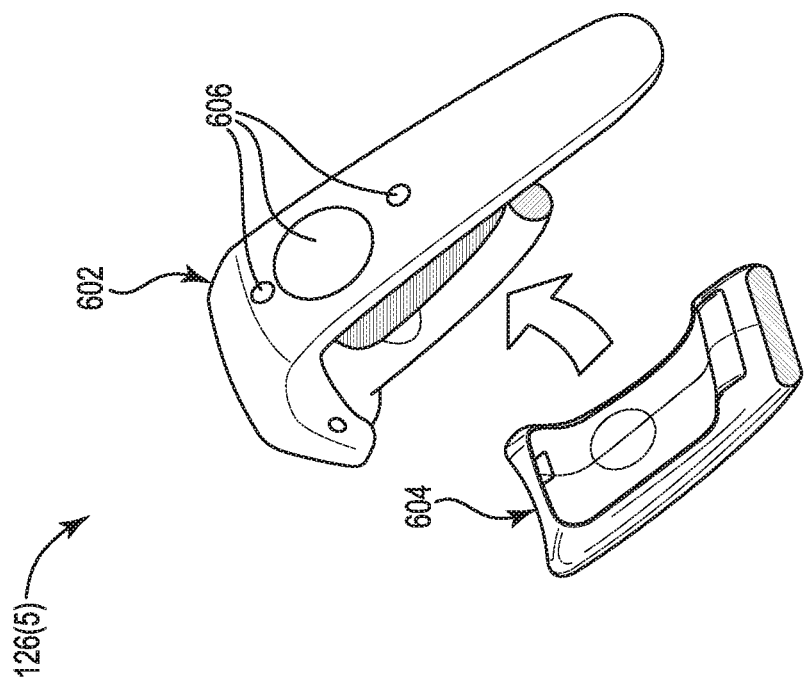

FIGS. 6A and 6B are diagrams illustrating a combined VR controller and mouse input device 126(5) according to one example. The input device 126(5) includes a VR controller housing 602 and a mouse attachment 604. The VR controller housing 602 includes 6DOF sensor 128 (FIG. 1). The mouse attachment 604 includes mouse sensor 130 (FIG. 6B). The VR controller housing 602 may include a number of controls 606 (e.g., buttons, trackpads, etc.) on its surface. The mouse attachment 604 is removably attachable by a user to a bottom surface of the housing 602. The mouse attachment 604 has the shape of a sled, with the bottom surface of the mouse attachment 604 being flat or substantially flat to facilitate sliding of the mouse attachment 604 along a work surface. The mouse attachment 604 enables the input device 126(5) to be used as a mouse even when the 3D tracking of the device 126(5) is not active. In some examples, the mouse attachment 604 may incorporate mouse buttons, or button events may be created from events from the controls 606 on the VR controller.

Figure 7B:
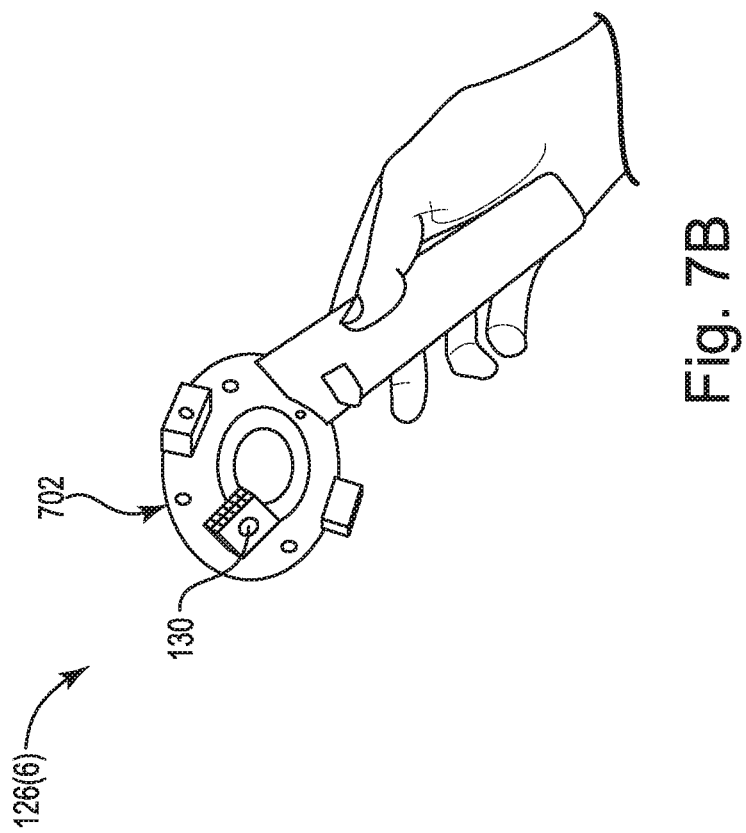
FIGS. 7A and 7B are diagrams illustrating a combined VR controller and mouse input device according to another example.
Figure 7A:
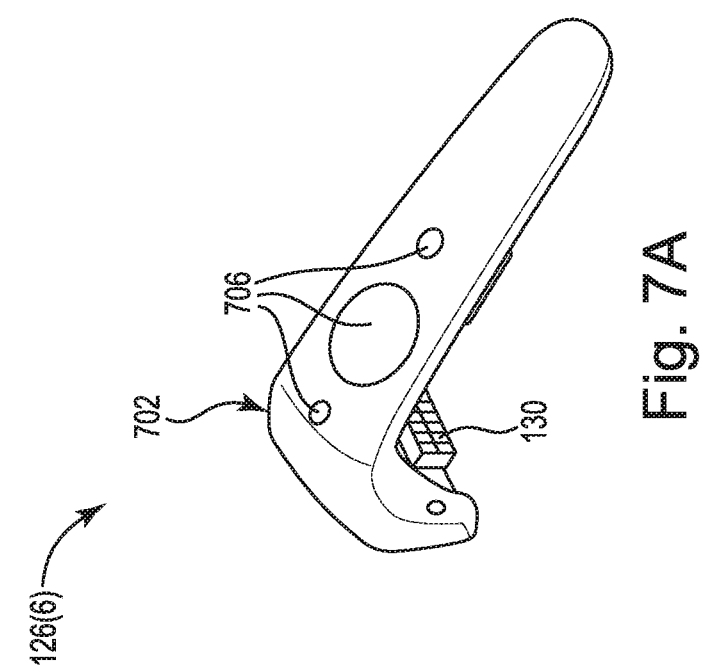

FIGS. 7A and 7B are diagrams illustrating a combined VR controller and mouse input device 126(6) according to another example. The input device 126(6) includes a VR controller housing 702, and an embedded mouse sensor 130 positioned on a bottom surface of the controller housing 702. The VR controller housing 702 includes 6DOF sensor 128 (FIG. 1), and a number of controls 706 (e.g., buttons, trackpads, etc.) on the surface of the housing 602. By using an embedded mouse sensor 130 as shown in FIG. 7A-7B, rather than a mouse attachment 604 as shown in FIGS. 6A-6B, the body of the input device 126(6) may be designed to have better ergonomics, in terms of shape and control layout, for both use cases (i.e., use as a mouse and use as a VR controller).

One example is directed to an input device for providing input to a computing device. The input device includes a hand-held controller movable across and above a work surface. The input device also includes a mouse sensor positioned on or in the hand-held controller to sense two-dimensional (2D) translation data representing translational movement of the hand-held controller across the work surface, and a six degree of freedom (6DOF) sensor positioned on or in the hand-held controller to sense 6DOF data representing position and orientation of the hand-held controller above the work surface.

The input device may include a third sensor positioned on or in the hand-held controller to sense when the hand-held controller is positioned on the work surface. The input device may include a multiplexer to receive the 2D translation data and the 6DOF data, and selectively output either the 2D translation data or the 6DOF data based on an output of the third sensor. The input device may include a wireless communication link shared by the mouse sensor and the 6DOF sensor to wirelessly transmit the translation data and 6DOF data to the computing device. The input device may include a first wireless communication link to wirelessly transmit the translation data to the computing device, and a second wireless communication link to wirelessly transmit the 6DOF data to the computing device. The mouse sensor may be included in a mouse attachment that is attachable to and removable from the hand-held controller by a user. The hand-held controller may be a virtual reality (VR) controller.

Another example is directed to a system, which includes a hand-held controller including a mouse sensor to sense two-dimensional (2D) translation data representing translational movement of the hand-held controller across a work surface, and a six degree of freedom (6DOF) sensor to sense 6DOF data representing position and orientation of the hand-held controller above the work surface. The system also includes a computing device to receive the 2D translation data and the 6DOF data, and at least one processor in the computing device to modify a display of information based on the received 2D translation data and the 6DOF data.

The computing device may include a first driver to receive the 2D translation data and output mouse events to an application, and a second driver to receive the 6DOF data and output 6DOF events to the application. The first driver may output the mouse events to the application only when the hand-held controller is moved on the work surface. The second driver may output the 6DOF events to the application only when the hand-held controller is moved above the work surface. The computing device may include a third driver to detect when the hand-held controller is positioned on the work surface. The computing device may use the 2D translation data to increase the precision of horizontal components of the 6DOF data when the hand-held controller is positioned on the work surface.

Figure 8:
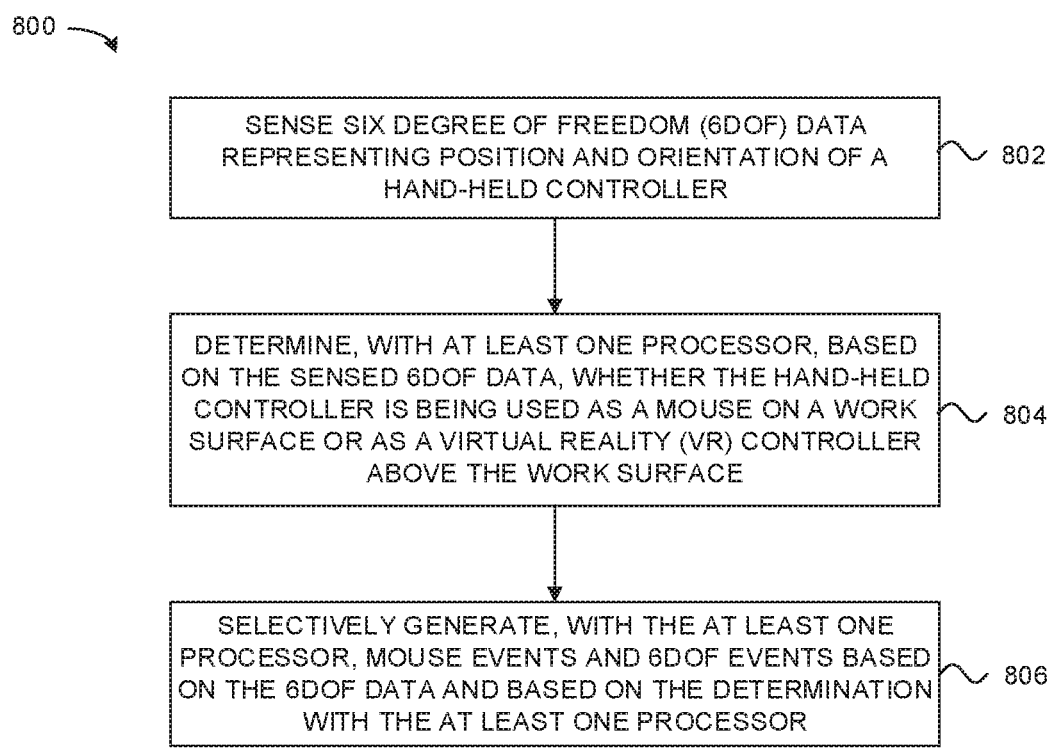
FIG. 8 is a flow diagram illustrating a method for generating 6DOF events and mouse events according to one example.

Yet another example is directed to a method. FIG. 8 is a flow diagram illustrating a method 800 for generating 6DOF events and mouse events according to one example. At 802, the method 800 senses 6DOF data representing position and orientation of a hand-held controller. At 804, the method 800 determines, with at least one processor, based on the sensed 6DOF data, whether the hand-held controller is being used as a mouse on a work surface or as a virtual reality (VR) controller above the work surface. At 806, the method 800 selectively generates, with the at least one processor, mouse events and 6DOF events based on the 6DOF data and based on the determination with the at least one processor. The method 800 may further include modifying, with the at least one processor, a display of information based on the generated mouse events and 6DOF events.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An input device for providing input to a computing device, comprising:
   a hand-held controller movable across and above a work surface;
   a mouse sensor positioned on or in the hand-held controller to sense two-dimensional (2D) translation data representing translational movement of the hand-held controller across the work surface;
   a six degree of freedom (6DOF) sensor positioned on or in the hand-held controller to sense 6DOF data representing position and orientation of the hand-held controller above the work surface;
   a third sensor positioned on or in the hand-held controller to sense when the hand-held controller is positioned on the work surface; and
   a multiplexer to receive the 2D translation data and the 6DOF data, and selectively output either the 2D translation data or the 6DOF data based on an output of the third sensor.

2. The input device of claim 1, and further comprising:
   a wireless communication link shared by the mouse sensor and the 6DOF sensor to wirelessly transmit the translation data and 6DOF data to the computing device.

3. The input device of claim 1, and further comprising:
   a first wireless communication link to wirelessly transmit the translation data to the computing device; and
   a second wireless communication link to wirelessly transmit the 6DOF data to the computing device.

4. The input device of claim 1, wherein the mouse sensor is included in a mouse attachment that is attachable to and removable from the hand-held controller by a user.

5. The input device of claim 1, wherein the hand-held controller is a virtual reality (VR) controller.

6. A system comprising:
   a hand-held controller including a mouse sensor to sense two-dimensional (2D) translation data representing translational movement of the hand-held controller across a work surface, and a six degree of freedom (6DOF) sensor to sense 6DOF data representing position and orientation of the hand-held controller above the work surface;
   a computing device to receive the 2D translation data and the 6DOF data; and
   at least one processor in the computing device to modify a display of information based on the received 2D translation data and the 6DOF data, wherein the computing device includes a first driver to receive the 2D translation data and output mouse events to an application, and a second driver to receive the 6DOF data and output 6DOF events to the application.

7. The system of claim 6, wherein the first driver outputs the mouse events to the application only when the hand-held controller is moved on the work surface.

8. The system of claim 6, wherein the second driver outputs the 6DOF events to the application only when the hand-held controller is moved above the work surface.

9. The system of claim 6, wherein the computing device includes a third driver to detect when the hand-held controller is positioned on the work surface.

10. The system of claim 9, wherein the computing device uses the 2D translation data to increase precision of horizontal components of the 6DOF data when the hand-held controller is positioned on the work surface.

11. An input device for providing input to a computing device, comprising:
    a hand-held controller movable across and above a work surface;
    a mouse sensor positioned on or in the hand-held controller to sense two-dimensional (2D) translation data representing translational movement of the hand-held controller across the work surface;
    a six degree of freedom (6DOF) sensor positioned on or in the hand-held controller to sense 6DOF data representing position and orientation of the hand-held controller above the work surface;
    a first wireless communication link to wirelessly transmit the translation data to the computing device; and
    a second wireless communication link to wirelessly transmit the 6DOF data to the computing device.

12. The system of claim 6, wherein the hand-held controller includes a third sensor to sense when the hand-held controller is positioned on the work surface.

13. The system of claim 12, wherein the hand-held controller includes a multiplexer to receive the 2D translation data and the 6DOF data, and selectively output either the 2D translation data or the 6DOF data based on an output of the third sensor.

14. The system of claim 6, wherein the hand-held controller includes a wireless communication link shared by the mouse sensor and the 6DOF sensor to wirelessly transmit the 2D translation data and 6DOF data to the computing device.

15. The system of claim 6, wherein the hand-held controller includes a first wireless communication link to wirelessly transmit the 2D translation data to the computing device, and a second wireless communication link to wirelessly transmit the 6DOF data to the computing device.

16. The system of claim 6, wherein the hand-held controller is a virtual reality (VR) controller.

17. The input device of claim 11, and further comprising:
    a third sensor positioned on or in the hand-held controller to sense when the hand-held controller is positioned on the work surface.

18. The input device of claim 17, and further comprising:
    a multiplexer to receive the 2D translation data and the 6DOF data, and selectively output either the 2D translation data or the 6DOF data based on an output of the third sensor.

19. The input device of claim 11, wherein the hand-held controller is a virtual reality (VR) controller.

* * * * *